US009162896B2

(12) United States Patent
Kranbuehl et al.

(10) Patent No.: US 9,162,896 B2
(45) Date of Patent: Oct. 20, 2015

(54) METHOD FOR MAKING POLYMER COMPOSITES CONTAINING GRAPHENE SHEETS

(75) Inventors: David Kranbuehl, Williamsburg, VA (US); Sarah Cotts, Williamsburg, VA (US); Hannes C. Schniepp, Williamsburg, VA (US); Minzhen Cai, Williamsburg, VA (US); Arthur Jaeton Glover, Williamsburg, VA (US)

(73) Assignee: College of William and Mary, Williamsburg, VA (US)

( * ) Notice: Subject to any disclaimer, the term of this patent is extended or adjusted under 35 U.S.C. 154(b) by 758 days.

(21) Appl. No.: 13/375,045

(22) PCT Filed: May 28, 2010

(86) PCT No.: PCT/US2010/036555
§ 371 (c)(1),
(2), (4) Date: Nov. 29, 2011

(87) PCT Pub. No.: WO2010/141348
PCT Pub. Date: Dec. 9, 2010

(65) Prior Publication Data
US 2012/0068122 A1  Mar. 22, 2012

Related U.S. Application Data

(60) Provisional application No. 61/182,722, filed on May 31, 2009.

(51) Int. Cl.
*C01B 31/04* (2006.01)
*B82Y 30/00* (2011.01)
*B82Y 40/00* (2011.01)
*H01B 1/04* (2006.01)

(52) U.S. Cl.
CPC ............ *C01B 31/0476* (2013.01); *B82Y 30/00* (2013.01); *B82Y 40/00* (2013.01)

(58) Field of Classification Search
CPC ...... B82Y 30/00; B82Y 40/00; C01B 31/043; C01B 31/023
USPC ........... 252/500–519.1; 423/445 R, 448, 460; 977/734, 753, 788, 895, 900
See application file for complete search history.

(56) References Cited

U.S. PATENT DOCUMENTS

| 2003/0186059 A1 | 10/2003 | Hirata et al. |
| 2007/0092432 A1 | 4/2007 | Prud'Homme et al. |
| 2007/0131915 A1* | 6/2007 | Stankovich et al. .......... 252/511 |
| 2008/0206124 A1* | 8/2008 | Jang et al. .................. 423/415.1 |

(Continued)

OTHER PUBLICATIONS

Jung, et al., "Tunable Electrical Conductivity of Individual Graphene Oxide Sheets Reduced at 'Low' Temperatures", Nano Lett, 2008, 8(12), pp. 4283-4287.

(Continued)

*Primary Examiner* — Tri V Nguyen
(74) *Attorney, Agent, or Firm* — Jason P. McDevitt

(57) ABSTRACT

In one embodiment, a method for producing a graphene-containing composition is provided, the method comprising: (i) mixing a graphene oxide with a medium to form a mixture; and (ii) heating the mixture to a temperature above about 40° C., whereby a graphene-containing composition is formed from the mixture. Composites of polymers with disperse functionalized graphene sheets and the applications thereof are also described.

10 Claims, 12 Drawing Sheets

(56) References Cited

U.S. PATENT DOCUMENTS

2008/0302561 A1 12/2008 Prud'Homme et al.
2009/0117467 A1 5/2009 Zhamu et al.
2010/0081057 A1* 4/2010 Liu et al. .................... 429/231.5
2010/0144904 A1* 6/2010 Wang et al. .................... 516/98
2010/0266964 A1* 10/2010 Gilje .............................. 430/322
2010/0291438 A1* 11/2010 Ahn et al. ..................... 429/212
2010/0323178 A1* 12/2010 Ruoff et al. ................... 428/220

OTHER PUBLICATIONS

The International Search Report received in the corresponding application PCT/US2010/036555, dated Jul. 30, 2010.

Ye, S. and Feng, J., "A new insight into the in situ thermal reduction of graphene oxide dispersed in a polymer matrix", Polym. Chem. (2013), vol. 4, pp. 1765-1768.

* cited by examiner

METHOD FOR MAKING POLYMER COMPOSITES CONTAINING GRAPHENE SHEETS

RELATED APPLICATIONS

This application claims priority to U.S. Provisional Application Ser. No. 61/182,722 filed May 31, 2009, which is hereby incorporated by reference in its entirety.

BACKGROUND OF THE INVENTION

Polymer nanocomposite materials have been the subject of research in recent years because of their potential for advanced properties and multi-functionality. Composites using graphene are of particular interest for a wide range of applications, as graphene combines outstanding mechanical, electrical, and barrier properties with a high surface area [1,2].

The fabrication of macroscopic amounts of single-layer graphene sheets many micrometers in size for large-scale application in nanocomposite materials is challenging. In order to study their electronic, mechanical, and other properties, individual graphene sheets have been produced by mechanical exfoliation at very low yields, but this approach is not well-suited for large-scale applications [6]. A more promising approach for high yields is exfoliation of graphite oxide: graphite is treated with strong acids and oxidizing agents to produce graphite oxide, in which the addition of oxygen-containing functional groups on the surfaces of sheets increases the lamellar spacing between sheets and reduces the van der Waals forces holding the sheets together. This material can be exfoliated either thermally at a very high temperature (e.g., 1050° C.) in a tube furnace in an inert gas [1] or by sonication in solvents [7]. The high demand in energy and time can create challenge in processing. The tube furnace exfoliation simultaneously exfoliates and reduces graphite oxide, thereby removing the vast majority of the functional groups from the oxidized material. These functional groups are released primarily as $CO_2$ and $H_2O$ gas. The resulting sheets are chemically similar to graphene. Accordingly, they are—like carbon nanotubes—very hydrophobic and thus difficult to handle in liquid processing. As a result, stable dispersions can only be achieved in a small number of relatively exotic solvents.

This difficulty is avoided when graphite oxide is exfoliated acoustically in solvents, such that the sheets retain a significant amount of their functional surface groups. Consequently, stable dispersions can be achieved in a large range of solvents including water, alcohols, and dimethylformamide. Due to this broad compatibility with solvent processing, these functionalized graphene sheets (FGS) [7] have been used in composite materials instead of graphene due to its ease of preparation and its compatibility with many polymers. Unfortunately, these more highly functionalized graphene sheets do not have the advantageous mechanical and thermal properties or conductivity as does graphene [8,9]. Thus, it would be desirable to benefit from the unique properties of graphene without sacrificing the ease of preparation of functionalized graphene sheets. Methods of reducing graphene oxide while in aqueous dispersions have been developed [6]. These methods, however, need surfactants to be added in considerable amounts to avoid collapse of the dispersion [7], since the reduction renders the sheets hydrophobic. The presence of such surfactants is not desired in the production of nanocomposites, where the interface between the sheets and the polymer matrix is important to the performance.

Thus, a need exists to provide a better method of fabricating a graphene-containing composite from graphene oxide.

BRIEF SUMMARY

One object of the present invention relates to a method of reducing graphene oxide, such that the atomic carbon to oxygen ratios thereof can increase and approach that of pure graphene, thereby producing composites of polymers with dispersed functionalized graphene sheets or nanoparticles. The method can be applicable to reduce any graphene precursor to graphene in a medium, such as a polymer composite. The presently described method allows controlled temperature and process time to optimize particle-polymer interfacial forces, thereby providing optimal macroscopic performance properties of the product without the need for a high temperature, an inert gas atmosphere, a high energy flash lamp, or additional chemical treatments or surfactants. Graphene oxide can be mixed with polymers to form polymer composites, which are then reduced by heating at conventional processing temperatures and times to provide the desired increase in the atomic carbon-oxygen ratio in the mixture for the enhancement in performance properties. The method described herein allows for a large-scale production of graphene-containing material with atomic carbon to oxide ratios approaching pure graphene at various concentrations. One advantage of the presently described method over the conventional methods is the much lower temperature and times needed to reduce graphene oxide to graphene in the present method. Potential applications include gas barrier materials, high-strength materials, and electrically conductive materials.

One embodiment provides a method for producing a graphene-containing composition, the method comprising: (i) mixing graphene oxide with a medium to form a mixture, wherein the medium comprises a solid or a precursor thereof; and (ii) heating the mixture to a temperature above about 40° C., whereby a graphene-containing composition is formed from the mixture. For example, in one embodiment the energy released during the exothermic reduction process of the graphene oxide to graphene transformation can be further used to heat up the graphene-medium nanocomposite. This method can be used to increase energy efficiency in the processing of the nanocomposites. Furthermore, the heat produced during the reduction can be used to accelerate the melting of the nanocomposite (e.g., for injection molding).

Another embodiment provides a heat sensor, comprising a graphene oxide and a medium, wherein at least some, such as substantially all, of the graphene oxide is transformed into at least one of (i) graphene and (ii) graphene oxide with a smaller amount of functional groups when the heat sensor is exposed to an energy source, such as heat.

An alternative embodiment provides a method of modifying a property of a material, the method comprising: (i) introducing graphene oxide to a material; and then (ii) heating the material at a temperature sufficiently high to promote transformation of at least some, such as substantially all, of the graphene oxide, whereby a property of the material is modified via the formation.

BRIEF DESCRIPTION OF THE DRAWINGS

As shown in FIG. 4, this polymer has a weight loss at 110° C. of 14.35% due to water but only a weight loss of 0.43% after a hold for 3 hours at 250° C. due to modest degradation. There is virtually no weight loss during the 110° C. to 250° C. heating ramp.

DETAILED DESCRIPTION

Figure 1:
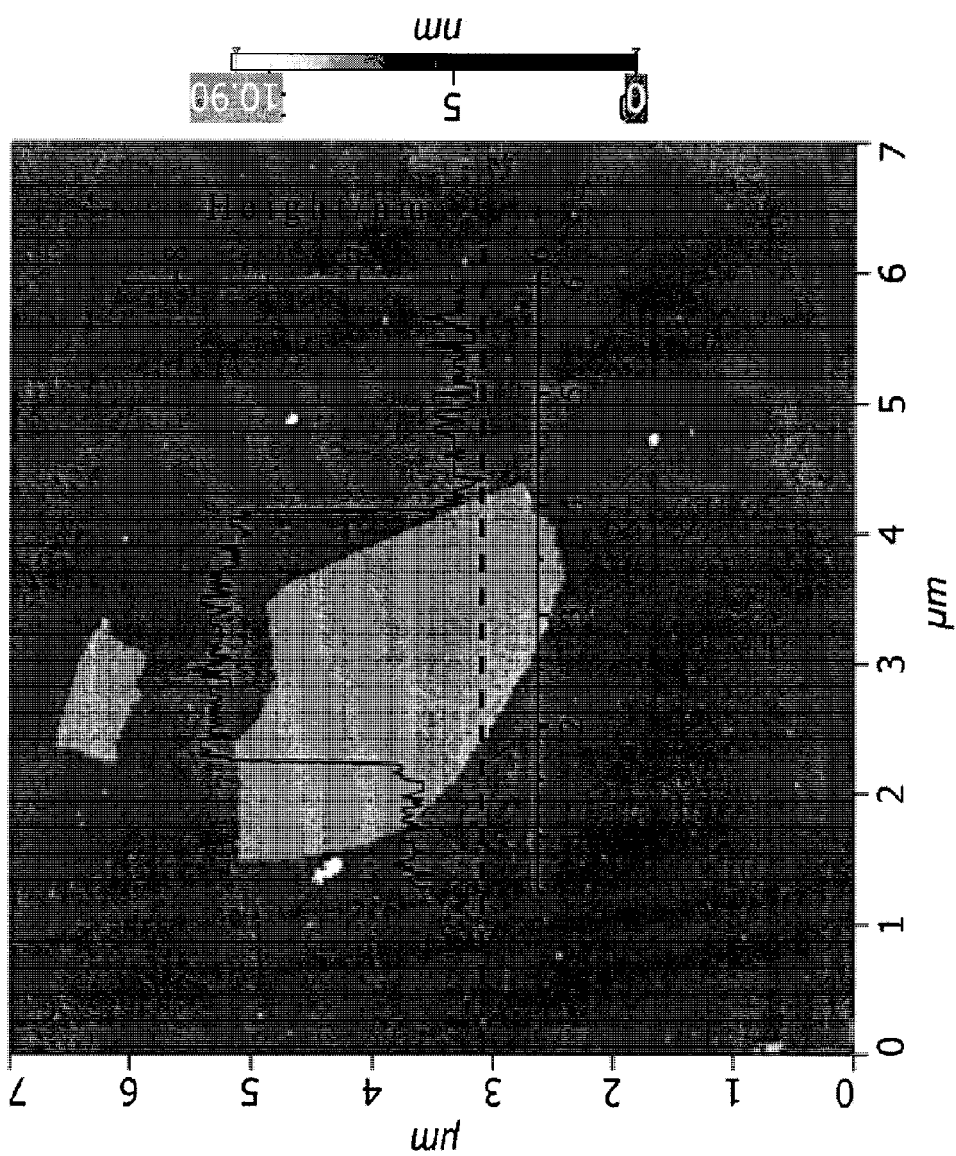
FIG. 1 shows an atomic force microscopy (AFM) image with two exfoliated graphene oxide sheets. The sheets have a thickness of approximately 1 nm, corresponding to single-layer sheets with hydroxyl and epoxy functional groups.

The term "graphite oxide" herein refers to functionalized graphene sheets (FGS)—the oxidized compositions of graphite. These compositions are not defined by a single stoichiometry. Rather, upon oxidation of graphite, oxygen-containing functional groups (e.g., epoxide, carboxyl, and hydroxyl groups) are introduced onto the graphite. Complete oxidation is not needed. The term "graphite oxide" includes graphene oxide, which is a morphological subset of graphite oxide. In some embodiments described herein, the terms "graphene oxide" and "graphite oxide" are used interchangeably.

Graphene oxide can refer to a graphene oxide material comprising either single-layer sheets or multiple-layer sheets of graphite oxide. Additionally, in one embodiment, a graphene oxide can refer to a graphene oxide material that contains at least one single layer sheet in a portion thereof and at least one multiple layer sheet in another portion thereof.

The term "graphene" refers to a one-atom-thick planar sheet of sp2-bonded carbon atoms that are densely packed in a honeycomb crystal lattice. In one embodiment, it refers to a single-layer version of graphite. Functionalized graphene can refer to graphene oxide, where the atomic carbon to oxygen ratio starts at approximately 2. This ratio can be increased in a medium, which can comprise a polymer, a polymer monomer resin or a solvent and approaches pure graphene.

Graphene-Containing Composition

In one embodiment, a method to produce a graphene-containing composition is provided. The composition can be in any form, such as one comprising a nanoparticle, a plurality of nanoparticles, a sheet, or a plurality of sheets. The composition can be, for example, a polymer or a composition comprising a polymer. The term "graphene-containing" refers to having pure graphene as a constituent in a mixture/composite or having a molecule resembling pure graphene as a constituent. The resemblance to pure graphene can be delineated via any suitable metrics. For example, the metric can be the hydrophobicity, electrical conductivity, or a combination thereof. A material can also be characterized as graphene-containing, if the atomic carbon to oxygen ratio is sufficiently large as compared to that of a graphene oxide. For example, such a material can be one having an atomic carbon to oxygen ratio approaching pure graphene, but not completely identical to graphene. In one embodiment, the ratio can be at least about 2, 4, 6, 8, 10, 20, 40, 60, 80, 100, at least about 200, or more. The ratio can be an indicator of the degree of surface functionality of the graphene oxide. The atomic ratio of carbon to oxygen of a graphene oxide can be presented as "FGS-#," wherein the symbol # denotes the ratio. See Table 1. Note the higher the value of #, the closer in resemblance the material is to pure graphene.

By controlling the atomic carbon to oxygen ratio, a graphite oxide or graphene oxide containing composition can also be fabricated, such as by Hummers method. For example, the graphite/graphene oxide material can have an atomic carbon to oxygen ratio of about 2. The ratio can be, for example about 2, such as 1.7, 1.8, 1.9, 2.1, 2.2, or 2.3. In another embodiment, a mixture of graphene-containing and graphene oxide containing compositions can be created. The graphene oxide can then undergo the reduction process as described above.

The method can comprise mixing a graphene oxide with a medium to form a mixture; and heating the mixture to a pre-defined temperature, whereby a graphene-containing composition is formed from the mixture. The temperature can be any suitable temperature, depending on the application. For example, it can be above about 30° C., such as above about 40° C., such as above about 60° C., such as above about 80° C., such as above about 100° C., such as above about 140° C., such as above about 180° C., such as above about 200° C., such as above about 250° C., such as above 300° C., such as above about 350° C., such as above about 400° C., such as above about 450° C. The selection of the heating temperature can depend on the materials chosen as the matrix.

The reduction processing time can be fairly short. For example, it can be less than or equal to 4 hours, such as less than or equal to 2 hours, such as less than or equal to 1 hour, such as less than or equal to 30 minutes, such as less than or equal to 20 minutes, such as less than or equal to 15 minutes, such as less than or equal to 10 minutes. As described above, one advantage of the presently described method is that it needs a much lower temperature and shorter period of heating time to reduce graphene oxide to fabricate graphene-containing material, as compared with conventional methods. Also, it is noted that in conventional methods, when graphene oxide is exposed to a high temperature, such as one that is above the range of the presently described method, the carbon backbone of the resulting products are likely to contain defects, and thus the products do not resemble pure graphene, as in the resultant product of the presently described method.

Graphene oxide can be mixed with any medium to form a mixture or composite. For example, the medium can comprise an inorganic or organic material, or both. The medium can also be air. In the case of an inorganic medium, the medium can comprise a metal, such as pure metal, alloy, compound, or combinations thereof, or glass. The medium can be crystalline or amorphous. The medium can comprise a solid or a precursor that can form a solid. For example, the precursor can be in the form of a fluid, such as a liquid, air, or a combination thereof. In the case of an organic medium, the medium can comprise a polymer, a monomer, a precursor to a polymer, or solvent, or combinations thereof, as discussed further below. Graphene oxide can be suitably mixed with polymers using any method known in the art. For example, the polymer can be dissolved in a suitable solvent into which graphene oxide is dispersed. Alternatively, molten polymer can be mixed with graphene oxide. In another embodiment, graphene oxide and a polymer resin could be dry-blended prior to thermal processing. In one embodiment, the graphene oxide in the graphene oxide-medium mixture can be in the form of a sheet that is very flat, or substantially free of wrinkle. After the heating step, the sheet (then has been transformed to be a graphene-containing material or a FGS with a smaller amount of functional groups) can then become wrinkled.

Polymers, monomers, and solvents, in which graphene oxide can be dispersed, can be used as a medium. They can include: polyethylene, polypropylene and copolymers thereof, polyesters, nylons, polystyrenes, polycarbonates, polycaprolactones, polycaprolactams, fluorinated ethylenes, polyvinyl acetate and its copolymers, polyvinyl chloride, polymethylmethacrylate and acrylate copolymers, high impact polystyrene, styrenic sheet molding compounds, polycaprolactones, polycaprolactams, fluorinated ethylenes, styrene acrylonitriles, polyimides, epoxies, polyurethanes, cellulose esters, or combinations thereof.

Different solvents can be used. The solvents can be polar or non-polar. Polar solvents can include water, n-methylpyrolidone (NMP), dimethylformamide (DMF), tetrahydrofuran (THF), alcohols, glycols such as ethylene glycol, propylene glycol and butylene glycol, aliphatic and aromatic esters, phthalates such as dibutyl phthalate, chlorinated solvents such as methylene chloride, acetic esters, aldehydes, glycol ethers, propionic esters, or combinations thereof. Mixtures with non-polar solvents are also possible.

In one embodiment, graphene oxide can be compounded into the monomeric precursors of these polymers to effect the polymerization in the presence of the graphene oxide nanoparticles. The graphene oxide in can be in the form of nanoparticles of sheets. For example, the graphene oxide nanoparticles or sheets can be uniformly dispersed in a medium material.

Graphene oxide can be incorporated into a medium material at a wide variety of concentrations. It is important to control the amount of graphene oxide being incorporated because adding too much graphene oxide could negatively affect the processability and performance of certain polymers. In one embodiment, the graphene oxide can be incorporated into (or mixed with) the medium at a weight ratio of at least about 1 part graphene oxide per 1000 parts medium (i.e., a weight percentage of at least 0.001%), such as at least about 0.01%, such as at least about 0.1%, such as at least about 1%, such as at least about 5% per medium weight.

Reduction to Graphene

The graphene oxide-medium mixture can be transformed via, for example, reduction of graphene oxide to graphene. The reduction can occur for at least some of the graphene oxide, such as substantially all or all of the graphene oxide. In one embodiment, reduction of graphene oxide to functionalized graphene in the material matrix can be accomplished by exposing the mixture to a form of energy. The energy source can be, for example, heat, such as an increase in temperature. The heating and reduction step can be carried out in open air. For example, the step can be carried out without the use of a sealed container, such as a sealed autoclave. Rather, the step can be carried out with exposure to ambiance air. In one embodiment, the heating can be carried out at any known polymer processing temperatures and times. The reduction reaction can be accelerated by heating at higher temperatures and longer times. The graphene oxide can be reduced in the medium matrix, such as a polymer matrix. The graphene oxide can also be reduced prior to the heating step. In one embodiment, the atomic carbon to oxygen ratio of the graphene oxide is controlled such that it is at a predefined level, such that after the heating step a predefined ratio in the final graphene-containing composition can be reached. In other words, by controlling the atomic carbon to oxygen ratio of the initial graphene oxide, the ratio of the final graphene-containing product can also be controlled.

The time and temperature can affect the final atomic carbon to oxygen ratio; and alternatively, the time and temperature can be based on the targeted ratio in the final product. Heating can be carried out by any suitable methods known in the art. Heating can be applied globally and uniformly to the entire mixture or can be applied thereto locally, for example, by selective spot treatment with a laser to create at least one localized region having a relative increase in graphene concentration in the mixture (as compared with the non treated region). As a result, in one embodiment, a patterned conductive element can be easily introduced into the polymer. One result of the reduction of graphene oxide to graphene is the increase in the atomic carbon to oxygen ratio in the material. In one embodiment, the transformation, and thus the change in the atomic carbon to oxygen ratio in graphene oxide, is a continuous process. Specifically, the ratio is continuous increasingly.

As described previously, the transformation of graphene oxide to graphene can provide improvement of the material properties. Incorporating graphene sheets into polymers can significantly increase mechanical, electrical, and thermal properties of the material, even at graphene concentrations as low as one percent by weight; see [2]. The molecular structure of graphene sheets, a continuous hexagonal network of strongly-linked $sp^2$ carbon atoms, and the confinement and coupling of conjugated electron and hole states, can give rise to extraordinary mechanical [3,4] and electronic transport [3,5] properties. The in-plane tensile modulus can be, for example, above 1 TPa [4]; the room-temperature carrier mobility can be as high as 10,000 $cm^2$/Vs [5], and the material can sustain currents of greater than $10^8$ A/$cm^2$ [5]. In one embodiment, graphene sheets can be essentially only a single-atomic layer thick (1 nm or less) and several micrometers across; their aspect ratio is thus very high, and surface areas above 1,000 $m^2$/g can be obtained.

Not to be bound by any particular theory, but these extreme topological properties can have several advantages with respect to applications in composites. For instance, (1) they have a dramatic effect on the gas barrier properties of a material, creating a tortuous pathway for small molecules [1]; (2) the percolation level can be reached at low concentrations; and (3) strong polymer-graphene interactions can be possible due to the high surface area. An important property of graphene oxide is its ability to remain completely exfoliated as single nanoparticles in a variety of fluids. However, the ultimate properties of the graphene oxide polymer nanocomposite depend not only on exfoliation but also on interfacial interaction at the nanoparticle-polymer interface. In general, one would like a strong interaction at the polymer-particle interface. Thus, the hydrophilicity, the hydrogen bonding, and the polarity of the particle surface can be tailored to be compatible with the polymer structure. As a result, in addition to the processing temperature and/or time, the type of medium used, such as the chemical structure thereof, can affect the extent of the reduction—i.e., the atomic carbon to oxygen ratio of the final graphene-containing material. Furthermore, the presence of the polymer matrix may facilitate the reduction of graphene oxide within that matrix. In one embodiment wherein the matrix comprises a polymer, the heating can be carried out a temperature sufficiently high but not high enough to degrade the polymer Depending on the polymer used, the heating can be carried out at 500° C. or less, such as 450° C. or less, such as 400° C. or less, such as 300° C. or less.

The transformation can result in improvement in mechanical properties, processing properties, electrical conductivity, diffusion barrier properties, and hydrogen storage capacity. For example, compared to the graphene oxide, graphene can have enhanced modulus, greater load at failure, increased hardness, improved elongation properties, reduced gas permeability, enhanced thermal processing, and enhanced electrical and electromagnetic field properties. For example, the electrical conductivity can be increased as a result of the formation of graphene from graphene oxide because graphene oxide is less electrically conductive than graphene. The terms "increase," improved," and "enhanced" herein denote an increase in the described property. For example, each of these terms can refer to a 20% increase or more, such as 40% increase or more, such as 60% increase or more, such as 80% increase or more, 100% increase or more, such as 150% increase or more, such as 200% increase or more.

Similarly, the term "reduced" herein can denote a similar magnitude in reduction to those listed above.

Applications

Because the transformation of graphene oxide to graphene can improve the material properties of the graphene-oxide mixture (as a result of the superior properties of graphene), such transformation can be used for the purpose of improving a material property. In one embodiment, graphene oxide can be used in a method to modify a property of a material, comprising: (i) introducing graphene oxide to a material to form a mixture/composite; and then (ii) transforming (e.g. reducing) at least some the graphene oxide to graphene to modify at least one property of the functionalized graphene-containing material. The property can be any material property as described above regarding the properties of graphene.

For example, in one embodiment, the transformation can be used to form a foamed material. The foamed material can be a polymer, an inorganic or metallic material, or combinations thereof. To produce such a material, graphene oxide can be inserted into the material form a mixture/composite, whereupon the mixture is heated to promote the reduction of graphene oxide to graphene. During the reduction, gases, such as $CO_2$ and/or $H_2O$ gases, can be released from graphene oxide, which gases can then create porosity in the mixture, whereby upon cooling a foamed material can be formed from the mixture.

Graphene oxide can also be used as a stabilizer. For example, graphene oxide can be inserted into a material (or medium), and by controlling the carbon and oxygen levels of the graphene oxide to a predefined level, graphene-containing nanoparticles with specific final carbon to oxygen ratio can be created. These nanoparticles can have a tendency to react readily with a gas or chemical in the mixture or ambiance, which gas or chemical could otherwise degrade the material. By removing these gases or chemicals by the nanoparticles, the useful life of the material, into which the graphene oxide is initially incorporated, can be extended.

By targeting specific atomic carbon to oxygen ratio in the initial graphene oxide, graphene-containing or graphite/graphene oxide containing material can be fabricated. The ratio can be controlled at various points during the process. For example, it can be controlled prior to the processing to ensure substantial uniform distribution of the graphene oxide in the medium matrix. For example, the parameters of the Hummers method can be controlled such that the graphene oxide produced thereby can have a predefined carbon to oxygen ratio. The ratio of the final product can also be controlled during or prior to the heating step to attain an FGS-# with the desired properties. The determination of the ideal ratio to be targeted can be an iterative process, taking into account the process parameters of the various process steps involved.

In one embodiment, graphene oxide, rather than graphene, is relied on to modify a material's property. Depending on the application, graphite oxide or graphene oxide nanoparticles can be incorporated into a material matrix, which can comprise a material that does not substantially react with the nanoparticles. Because nanoparticles do not substantially interact with the matrix material, these nanoparticles can rise to the surface of the material, thereby forming a protective layer thereover. For example, in one embodiment, a carbon surface layer and/or a gas barrier surface layer can be created over the material.

In another embodiment, graphene-containing nanoparticles, instead of graphene oxide nanoparticles, can be formed over the material, to provide an electrically conductive surface, which comprises these graphene-containing nanoparticles, over the material. In yet another embodiment, a graphene-containing gas barrier can be produced. Depending on the application, a gas barrier comprising graphene, instead of graphene oxide, can be used. No to be bound by any particular theory, but graphene sheets can be dense enough to create a barrier to gases, even for molecules/atoms as small as hydrogen and helium. Thus, when these impenetrable graphene sheets are added to a polymer, the gas molecules have to go around the sheets and thus take longer to diffuse (i.e., tortuosity effect). In one embodiment, the barrier can be over the material or can be within the material, depending on the location of the barrier.

Figure 12:
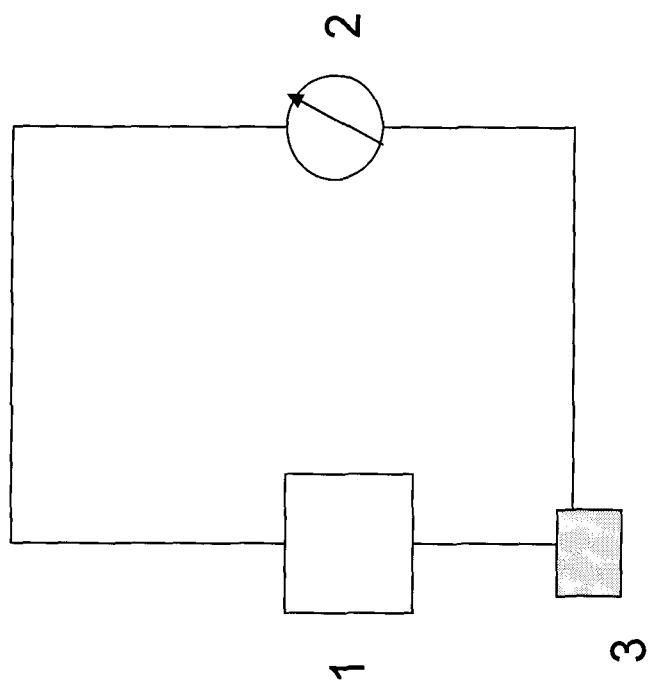
FIG. 12 shows a schematic of a heat sensor containing graphene oxide in one embodiment.

The change in electrical conductivity due to the transformation can be utilized. For example, a material that would undergo such a transformation can be used as a thermal or heat sensor. For example, in one embodiment, when a pre-defined temperature (e.g., exceeding about 140° C.) is reached as a result of exposure to an energy source, such as heat, the transformation of graphene oxide to graphene, and/or into FGS (e.g., graphene oxide) with a smaller amount of functional groups, in the heat sensor can render the device conductive, and the change in conductivity can allow monitoring of thermal load. A schematic of such a heat sensor is shown in FIG. 12. In FIG. 12, in one embodiment, the sensor 1, containing graphene oxide, can be connected to the heat source 3 and a multi-meter 2.

NON-LIMITING WORKING EXAMPLES

Materials and Methods

Oxidation of Graphite.

Graphite oxide was prepared by the Hummers method [10]. First, 4 g sodium nitrate was added to 184 mL sulfuric acid and stirred until completely dissolved. Natural flake graphite (Asbury Carbons, Asbury, N.J., grade 3243, 99.5%) was added under vigorous stirring to avoid agglomeration. The solution became dark. After the graphite was well dispersed, 24 g of potassium permanganate were added slowly under stirring. During this process, the temperature can rise rapidly, creating severe effervescence. Potassium permanganate was added slowly enough to keep the temperature below 100° C. The suspension became thicker, turning into a slurry. The color turned from black to dark brown. After completion of the reaction, the slurry was cooled down. Subsequently, 400 mL of de-ionized water was added to the still very acidic solution, leading to an increase of temperature. After the temperature decreased to room temperature again, 80 mL of 10% hydrochloric acid and 200 mL of 3% hydrogen peroxide were added to the solution to reduce the residual permanganate and manganese dioxide. The graphite oxide slurry was still strongly acidic and was repeatedly washed using de-ionized water until the pH value of the slurry was above 5. The graphite oxide slurry was then filtered to obtain graphite oxide paste. The dried graphite oxide was obtained by heating the graphite oxide paste to remove residual water.

Exfoliation of Graphite Oxide to Produce Graphene Oxide.

During oxidation, oxygen-containing functional groups (hydroxyl and epoxy) are intercalated between the graphite layers, increasing the lamellar spacing. Not to be bound by any particular theory, but this reduces the attractive van der Waals forces between the layers and allows exfoliation into single-layer sheets in solvents by ultrasonication. Exfoliation of graphite oxide can be achieved in numerous solvents, including water, dimethylformamide (DMF), and dimethylacetamide (DMAc). In one embodiment, dried graphite oxide was weighed and exfoliated in water, DMF, or DMAc (all at 0.1 wt % of graphite oxide) by ultrasonication (tabletop ultrasonic cleaner FS-30D, Fisher Scientific, Pittsburgh, Pa.) for 1 hour. This process produced dark, uniform and stable dispersions of single-layer graphite oxide sheets (i.e., graphene oxide) in solvents, which did not precipitate even after several days. When diluted to a concentration of 0.001 wt %, these suspensions were light brown and clear, without any visible particles, indicating stable dispersion of submicron particles. The graphene oxide dispersions became viscous when the sheet concentrations were increased to around 0.5 wt %, because exfoliation produced a large number of single layer sheets.

Preparation of Polymer and Polymer Nanocomposite Samples.

Films of neat polyvinyl pyrrolidone (PVP) and polyvinyl pyrrolidone/vinyl acetate (PVP/VA; two versions with different molecular weight were used: Plasdone® S-630 and Plasdone® K-120) were prepared by dissolving the polymers as received in deionized water at concentrations of 10 wt % polymer. Films of neat polyether imide (PEI) were prepared by dissolving the polymer as received in DMF at a concentration of 10 wt % polymer.

To prepare polymer nanocomposite films containing 1 wt % graphene oxide, PVP and PVP/VA were dissolved in aqueous dispersions of 0.1 wt % graphene oxide, prepared as described above, in concentrations of 10 wt % polymer. PEI nanocomposite films were prepared by dissolving PEI in a DMF-based solution of 0.1% graphene oxide prepared as described above, at a concentration of 10 wt % polymer.

To cast films, the solutions of polymers or polymer nanocomposites were poured over clean glass plates and placed in a dry box with air flowing through at a temperature of 22° C. and 4% relative humidity. The films were left in the dry box for at least 12 hours, until they were dried through. The resulting films were 0.1-0.3 mm thick.

Characterization of Materials.

The most direct proof for exfoliation into single-layer sheets is provided by Atomic Force Microscopy (AFM), which was performed as follows. An aqueous graphene oxide suspension (0.01 wt %) was spin-coated at 2,000 RPM onto a freshly cleaved mica surface. The samples were examined using a NTEGRA Prima AFM (NT-MDT, Russia, Moscow). Contact-mode imaging was performed (BudgetSensors silicon nitride probes, SiNi, force constant 0.27 N/m, tip radius of curvature 15 nm) to measure the thickness of the sheets. The AFM images show that the great majority of the exfoliated sheets have a thickness of around 1 nm, as expected for single-layer graphene with attached functional groups (see FIG. 1).

Figure 2:
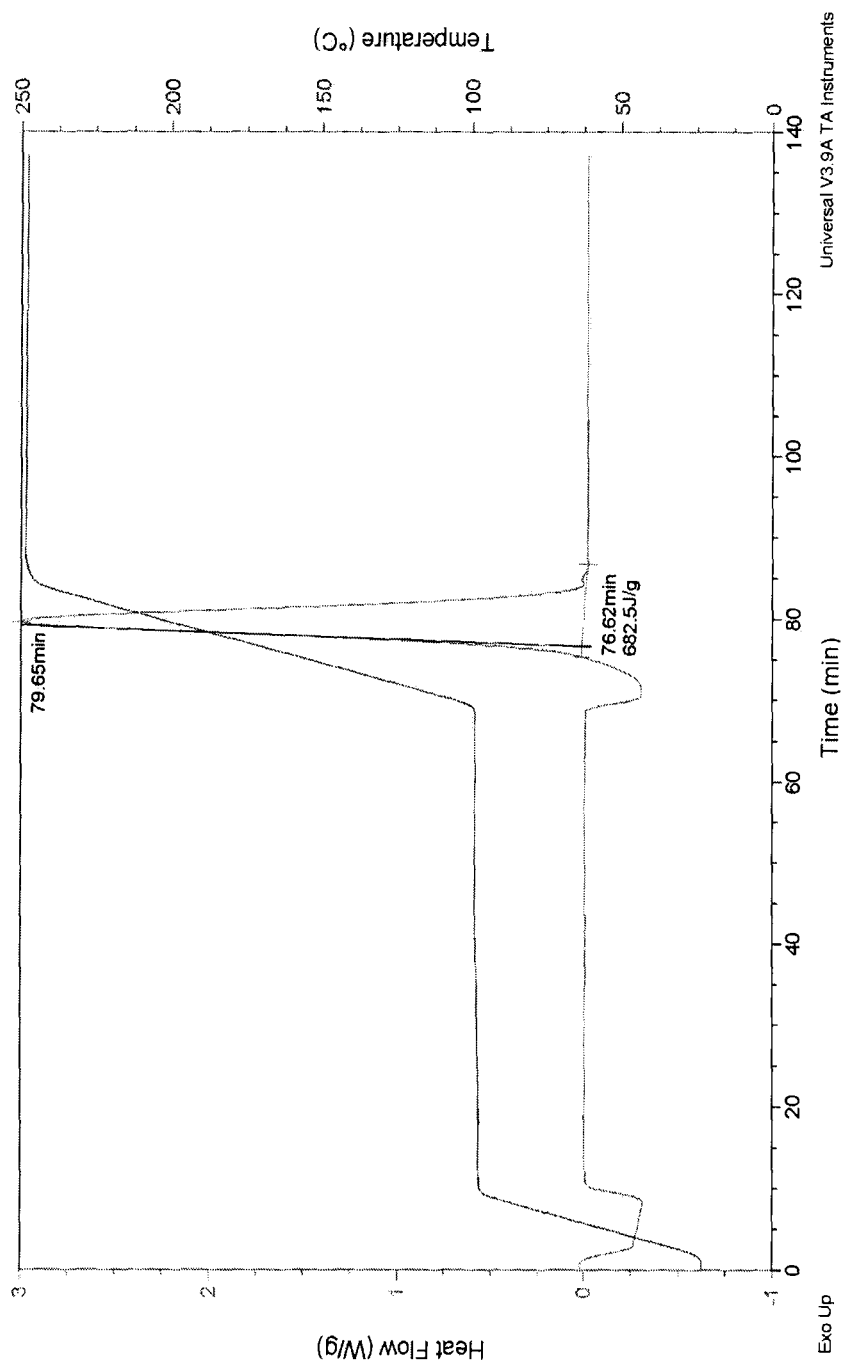
FIG. 2 shows a differential scanning calorimetry (DSC) plot, indicating that the reduction of graphite oxide is an initially endothermic reaction followed by an exothermic reaction. The reduction begins to occur around 110° C. The majority of the reduction occurs between 150° C. and 250° C. for the shown heating ramp.

Differential Scanning calorimetry ("DSC", 2920 Modulated DSC, TA Instruments, New Castle, Del.) was performed on a sample of graphite oxide to determine the time and temperature needed for it to be reduced, as shown in FIG. 2. A 5.0 mg sample of graphite oxide was sealed in a hermetic pan (TA Instruments) and heated to 100° C. and held for an hour to remove water. The endothermic peak seen in the first 10 minutes of the DSC plot in FIG. 2 is due to the heat of vaporization of water. When the temperature is increased to 150° C., there is a large exothermic peak from the reduction of graphite oxide. The majority of the conversion occurs between 150° C. and 250° C.

Figure 3:
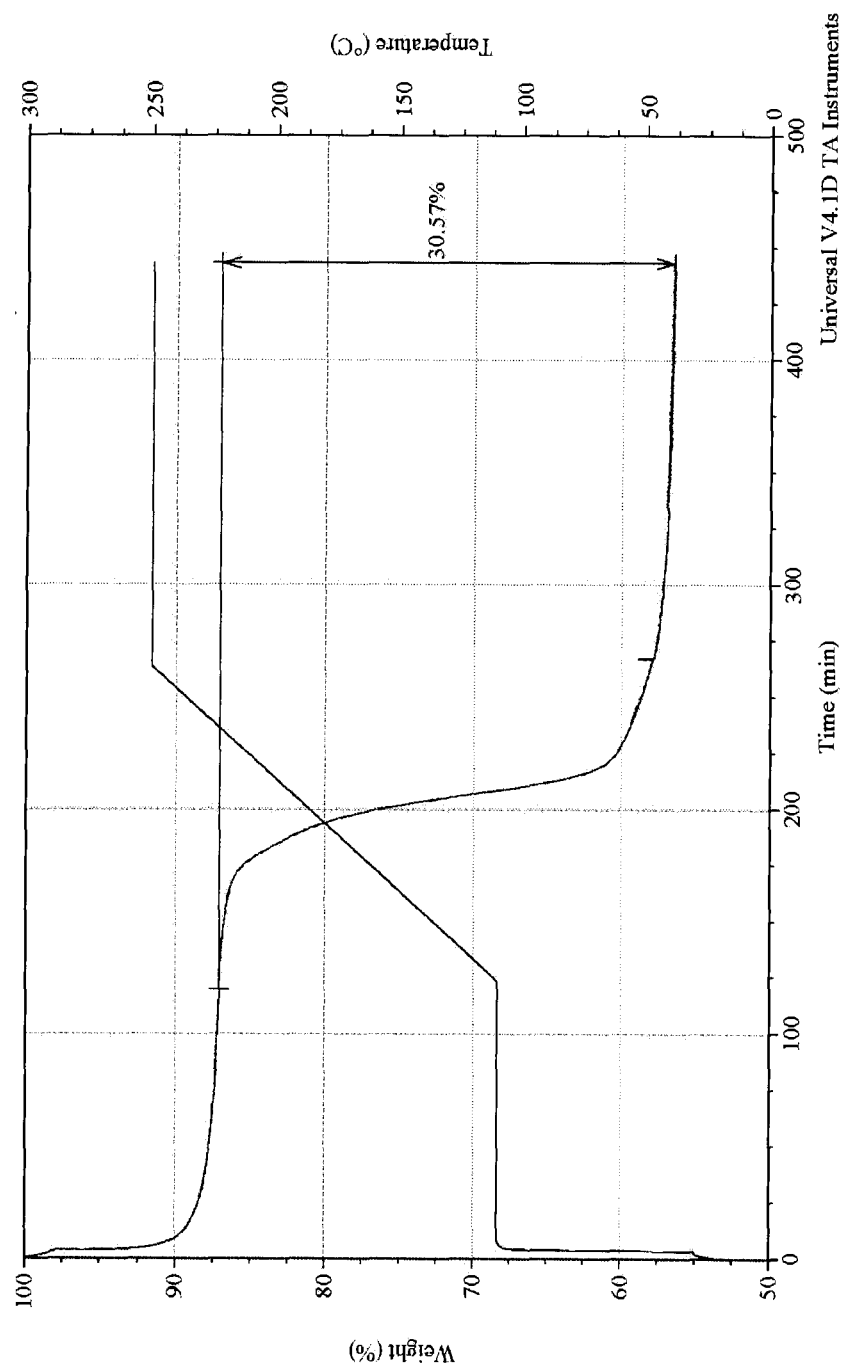
FIG. 3 shows a thermogravimetric analysis (TGA) graph, plotting sample weight as a function of time for a thermal reduction of graphite oxide.

The reduction of graphite oxide involves a weight loss due to the loss of oxygen [1, 11]. This weight change was measured using Thermal Gravimetric Analysis ("TGA", TA Instruments TGA Q500 V6.3 Build 189). A sample of graphite oxide was heated on a platinum weighing pan under nitrogen, and its weight change was monitored at 0.1 μg precision, as shown in FIG. 3. The sample was heated to 110° C. and held for 2 hours to remove all water. The temperature was increased to 250° C. and held for 3 hours to ensure that all the graphite oxide was reduced. The loss of 30.57% of the sample's weight is due to the loss of oxygen when the material is reduced.

Example 1

Figure 4:
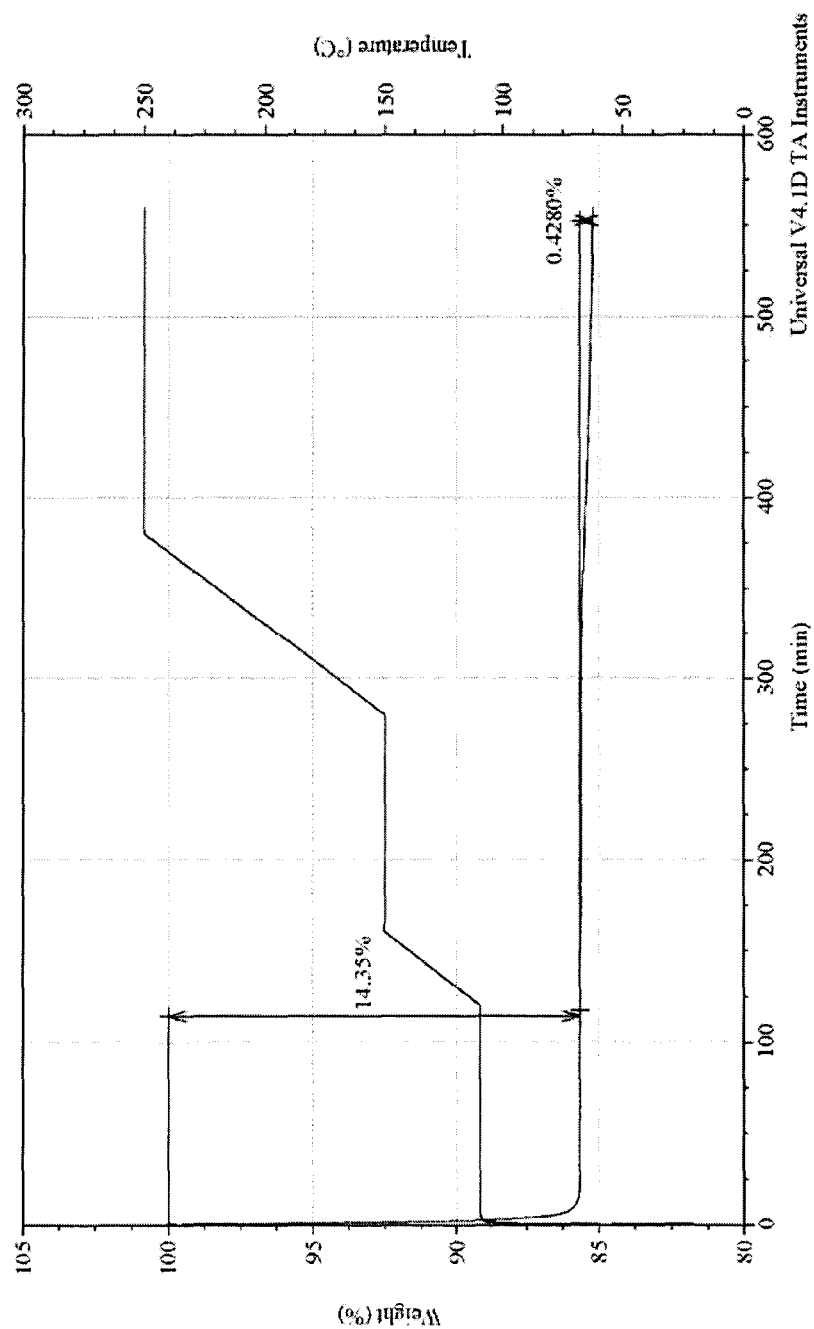
FIG. 4 shows a TGA graph, plotting sample weight as a function of time for a neat polymer film made from a commercially available polyvinyl pyrrolidone polymer (Plasdone® C-17, available from International Specialty Products Inc., Wayne, N.J.).

Just as bulk graphite oxide can be thermally reduced, it can also be reduced in its exfoliated version—graphene oxide—in situ when it is already incorporated into a polymer as disperse single-layer sheets by heating the composite. Using TGA, the weight change of polymer-graphene oxide composites is monitored to verify the reduction occurs within the polymer. In a first step, TGA was performed on a film of the polymer Plasdone® C-17 (a polyvinyl pyrrolidone polymer available from International Specialty Products Inc., Wayne, N.J.) in the absence of any filler particles (see FIG. 4). The sample was first heated to 110° C. and held for 2 hours. All of the water in the sample, 14.35% by weight, was evaporated in the first few minutes. The sample was then heated to 150° C., the temperature at which graphene oxide would be reduced. The temperature was held at 150° C. for 2 hours, and there was no further weight change. When the temperature was increased to 250° C. and held for three hours, there was a modest additional decrease in weight (0.43%) due to slight degradation of the polymer. The majority of the weight loss was likely due to loss of water, which occurs quickly and at the lower temperature of 100° C.

Figure 5:
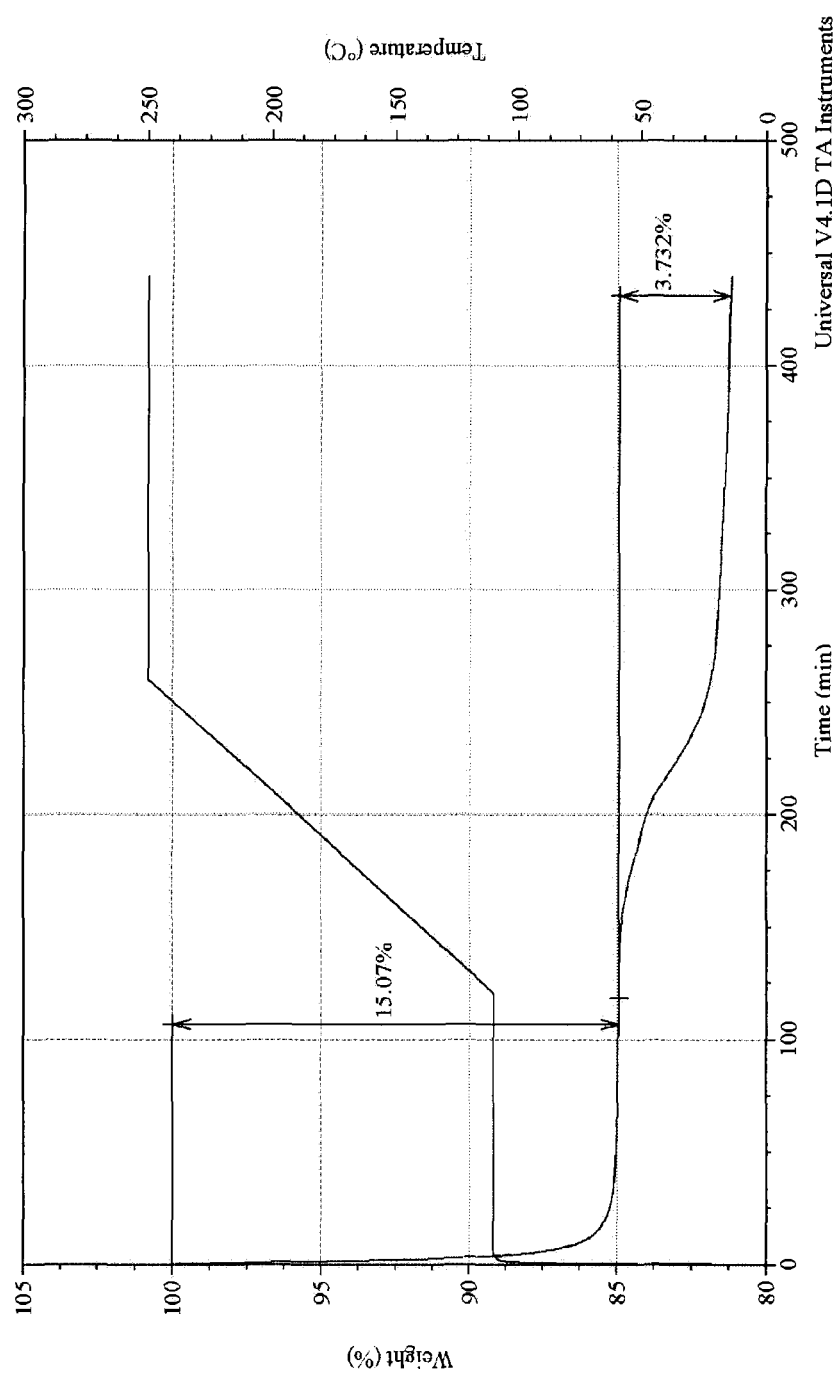
FIG. 5 shows a TGA graph, plotting sample weight as a function of time for a Plasdone® C-17 polymer composite containing added graphene oxide. Relative to the polymer in FIG. 4, the weight loss due to the loss of water upon heating to 110° C. is comparable. However, in this case, there is a significant weight loss of 3.7% upon heating to 250° C. and holding at that temperature for three hours. The majority of this weight loss occurs between 150° C. and 250° C. due to conversion of graphene oxide to graphene.

In the second step, TGA was performed on the polymer composite, a dispersion of graphene oxide in Plasdone® C-17 polymer. Following the same temperature curve as the neat polymer shown in FIG. 4, the polymer nanocomposite sample was heated to 110° C. and held for 2 hours to ensure that all water has been removed. As shown in FIG. 5, the temperature was then slowly increased to 250° C. and held for three hours. In contrast to the neat polymer, the sample began to lose weight at 150° C. Not to be bound by any particular theory, but this can be explained by the presence of the added graphene oxide sheets. Since this is the temperature range for which graphite oxide loses weight due to reduction in one embodiment (see FIG. 3), this recorded weight loss herein verifies that the reduction of graphene oxide occurred while incorporated in the polymer.

Example 2

Figure 6:
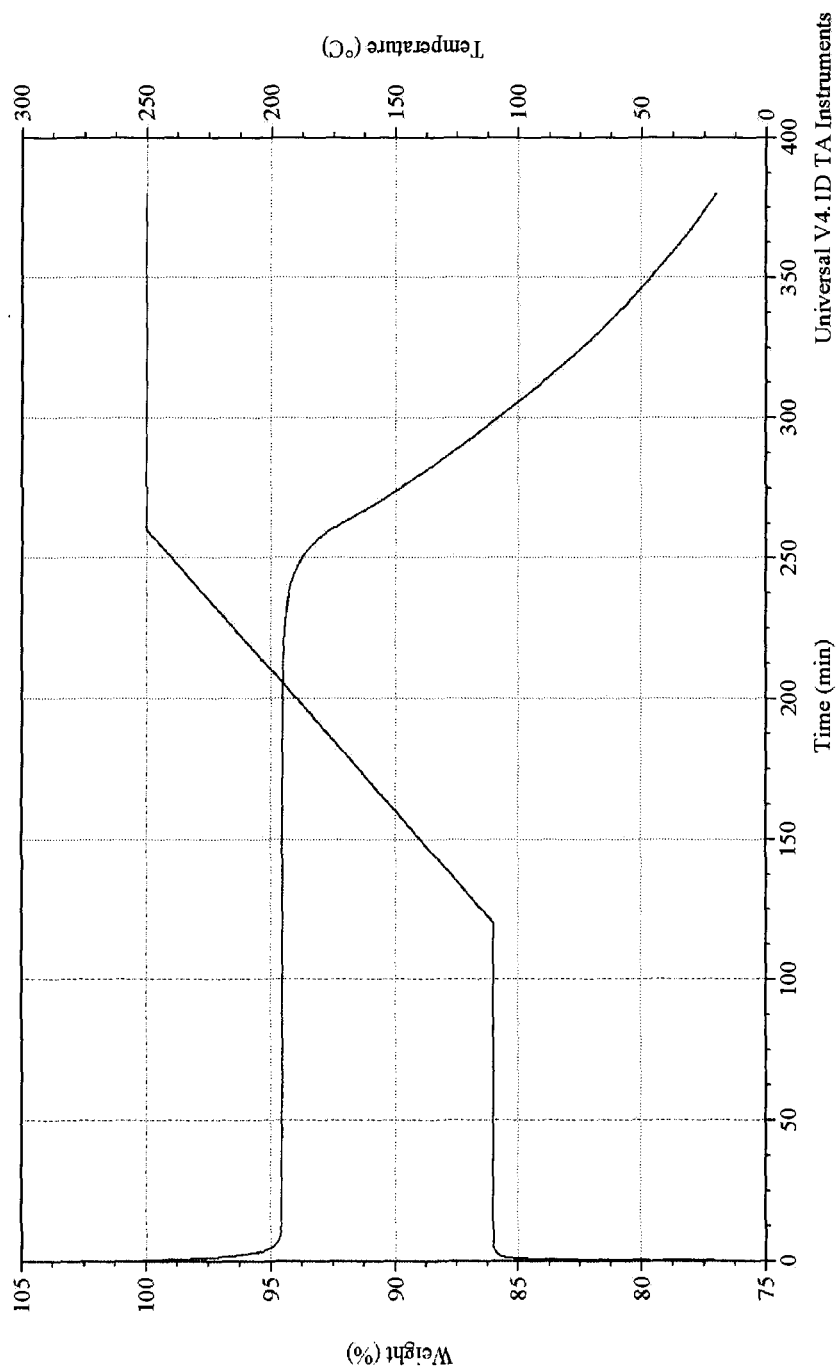
FIG. 6 shows a TGA graph, plotting sample weight as a function of time for a neat polymer film made from a commercially available polyvinyl pyrrolidone-vinyl acetate copolymer (Plasdone® S-630, available from International Specialty Products Inc., Wayne, N.J.). As in FIG. 4, this polymer has a significant weight loss at 110° C. due to loss of water, but has virtually no weight loss upon heating to 220° C., with significant weight loss thereafter due to polymer degradation.
Figure 7:
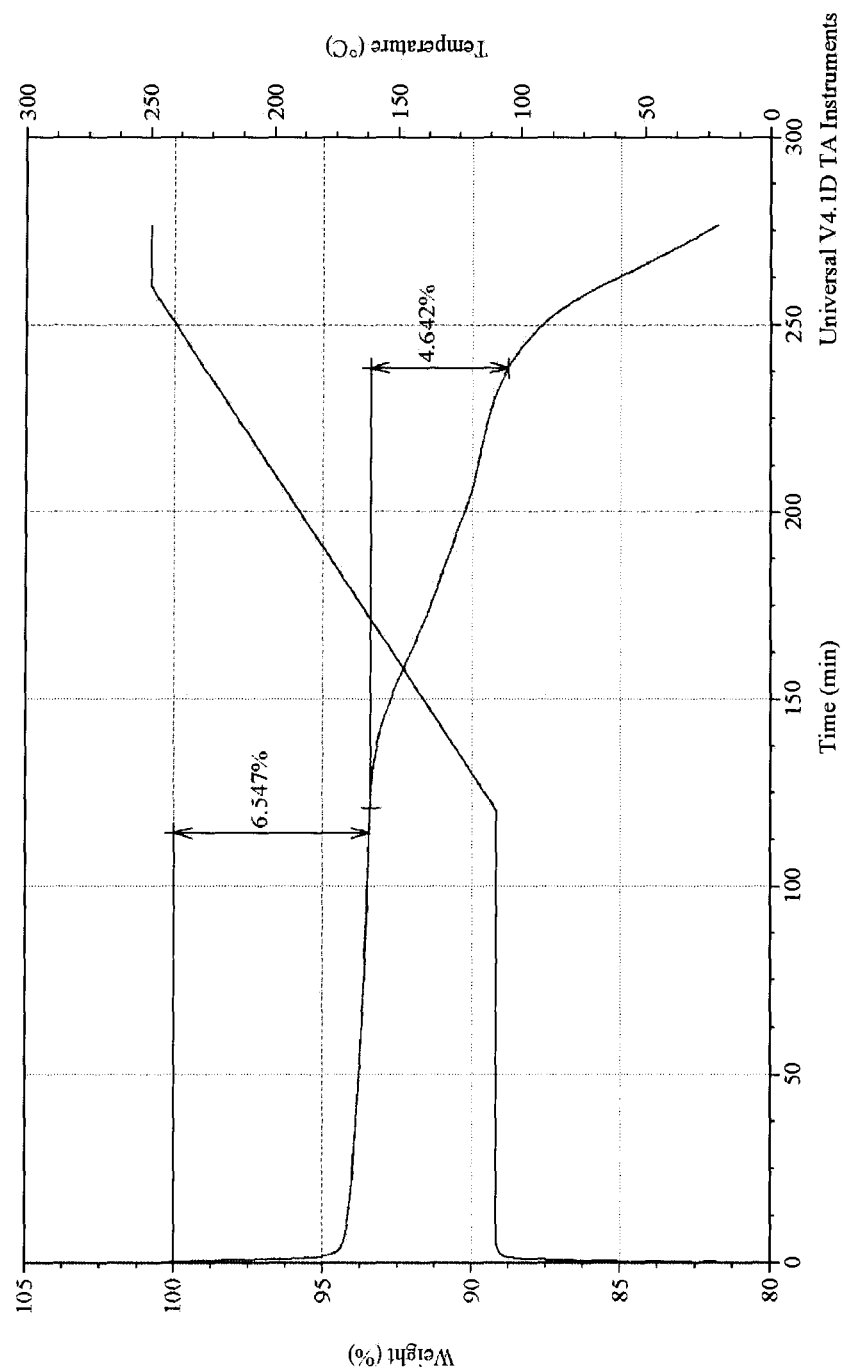
FIG. 7 shows a TGA graph, plotting sample weight as a function of time for a Plasdone® S-630 polymer composite containing added graphene oxide. Relative to the polymer in FIG. 6, the weight loss due to the loss of water upon heating to 110° C. is comparable. However, in this case, there is significant weight loss of 4.6% upon heating to 220° C., at which temperature the polymer degrades.

The steps of Example 1 were repeated with a different polymer, Plasdone® S-630, a polyvinyl pyrrolidone-vinyl acetate copolymer available from International Specialty Products Inc., Wayne, N.J.). FIG. 6 shows the TGA of a film of Plasdone® S-630 with no added graphene oxide. Again, the water is all lost very quickly, at 110° C. As the temperature is increased, there is no observed weight change until the temperature reached 225° C., at which point the polymer began to degrade. The same experiment was performed on a composite of Plasdone® S-630 and graphene oxide (see FIG. 7). The water was lost quickly at 110° C., as was observed with the neat polymer film. In contrast to the results with the neat polymer film, however, the TGA showed a loss of weight for the composite polymer when the temperature was increased to 140° C.; not to be bound by any particularly theory, but this can be attributable to the reduction of graphene oxide to produce graphene. The rate of weight loss slows down until the temperature reaches the degradation temperature 225° C., at which point the weight dropped more rapidly. The change in weight seen at 140° C. in the composite was not observed in the neat polymer, which demonstrates that graphene oxide was reduced to graphene in the polyvinyl pyrrolidone-vinyl acetate copolymer polymer matrix.

Example 3

Figure 8:
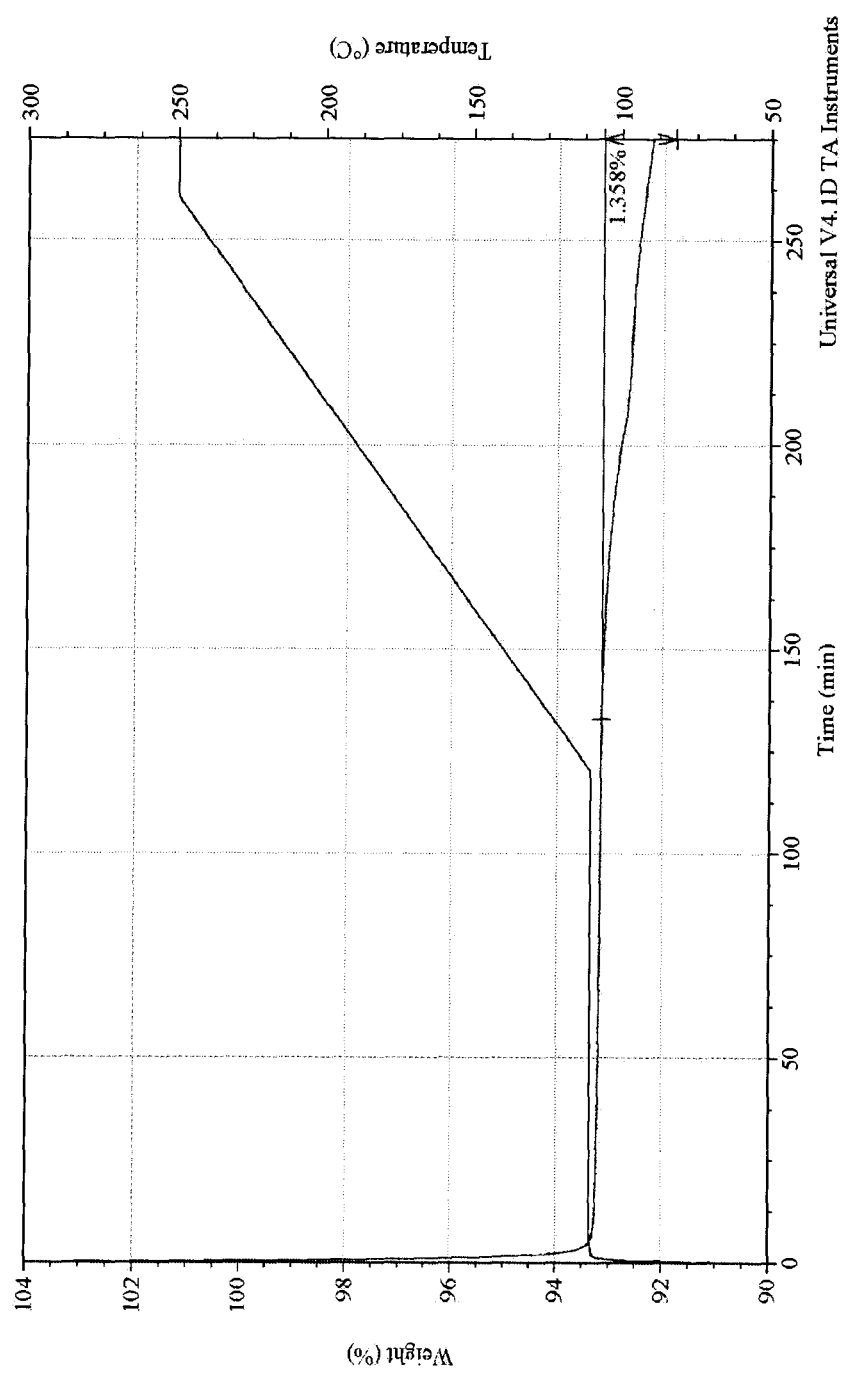
FIG. 8 shows a TGA graph, plotting sample weight as a function of time for a Plasdone® K-120 polymer (a commercially available polyvinyl pyrrolidone-vinyl acetate copolymer available from International Specialty Products Inc., Wayne, N.J., that has a higher molecular weight than Plasdone® S-630) composite containing graphene oxide. When the sample is heated to 110° C., there is the expected loss in weight due to water evaporation. When the sample is heated in a temperature ramp from 110° C. to 250° C., there is a weight loss of 1.4%. The majority of this weight loss occurs between 150° C. and 250° C. due to conversion of graphene oxide to graphene and loss of bound water.

A higher molecular weight polyvinyl pyrrolidone-vinyl acetate copolymer was used in this example. FIG. 8 shows a TGA graph, plotting polymer weight as a function of time for a Plasdone® K-120 (a commercially available polyvinyl pyrrolidone-vinyl acetate copolymer available from International Specialty Products Inc., Wayne, N.J., that has a higher molecular weight than Plasdone® S-630) polymer composite containing added graphene oxide. The majority of the water was lost in the first few minutes, when the sample was held at 110° C. When the temperature was increased, the weight began to decrease starting at 140° C., with a total weight loss of 1.3% due to reduction of graphene oxide and removal of some residual solvent, again demonstrating that graphene oxide was reduced to graphene in the polymer matrix.

Example 4

Figure 9:
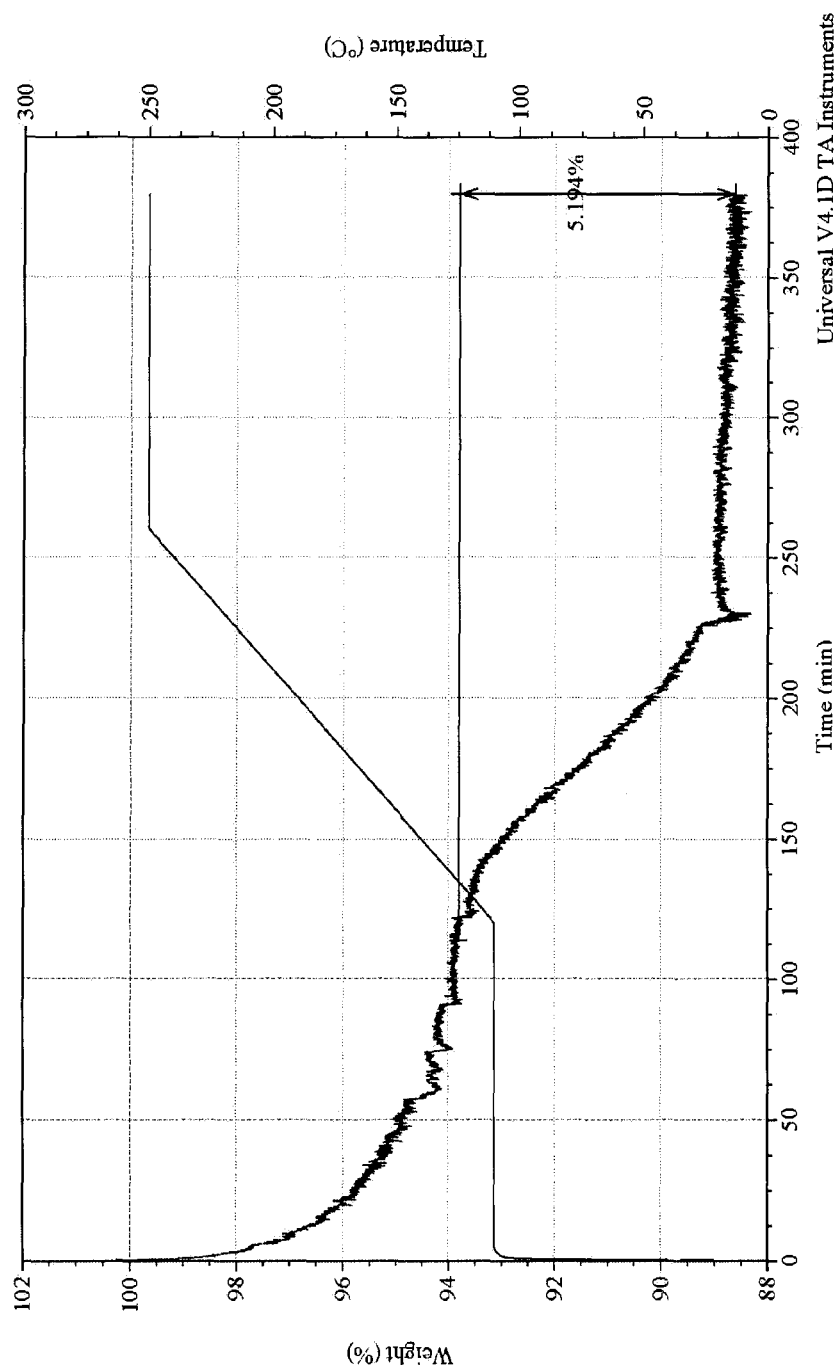
FIG. 9 shows a TGA graph, plotting sample weight as a function of time for a mixture of graphene oxide and graphite oxide (primarily graphene oxide) dispersed in a high performance polyether imide polymer. When the mixture is heated to 110° C., there is the expected loss in weight due to solvent (dimethyl formamide) evaporation (TGA data). When the sample is heated in a temperature ramp from 110° C. to 250° C. and held for 3 hours, there is a weight loss of 5.2%. The majority of this weight loss occurs between 150° C. and 250° C. due to conversion to graphene and loss of additional solvent.

A composite of a polyether imide polymer (ULTEM®, available from the General Electric Company) and graphene oxide was analyzed by TGA as shown in FIG. 9. The solvent used was dimethyl formamide, which has a boiling point of 165° C. and cannot be entirely removed from the sample before the reduction of graphene oxide, which began around 150° C. The weight loss after 150° C. was likely due to the reduction of graphene oxide and the removal of solvent.

Figure 10:
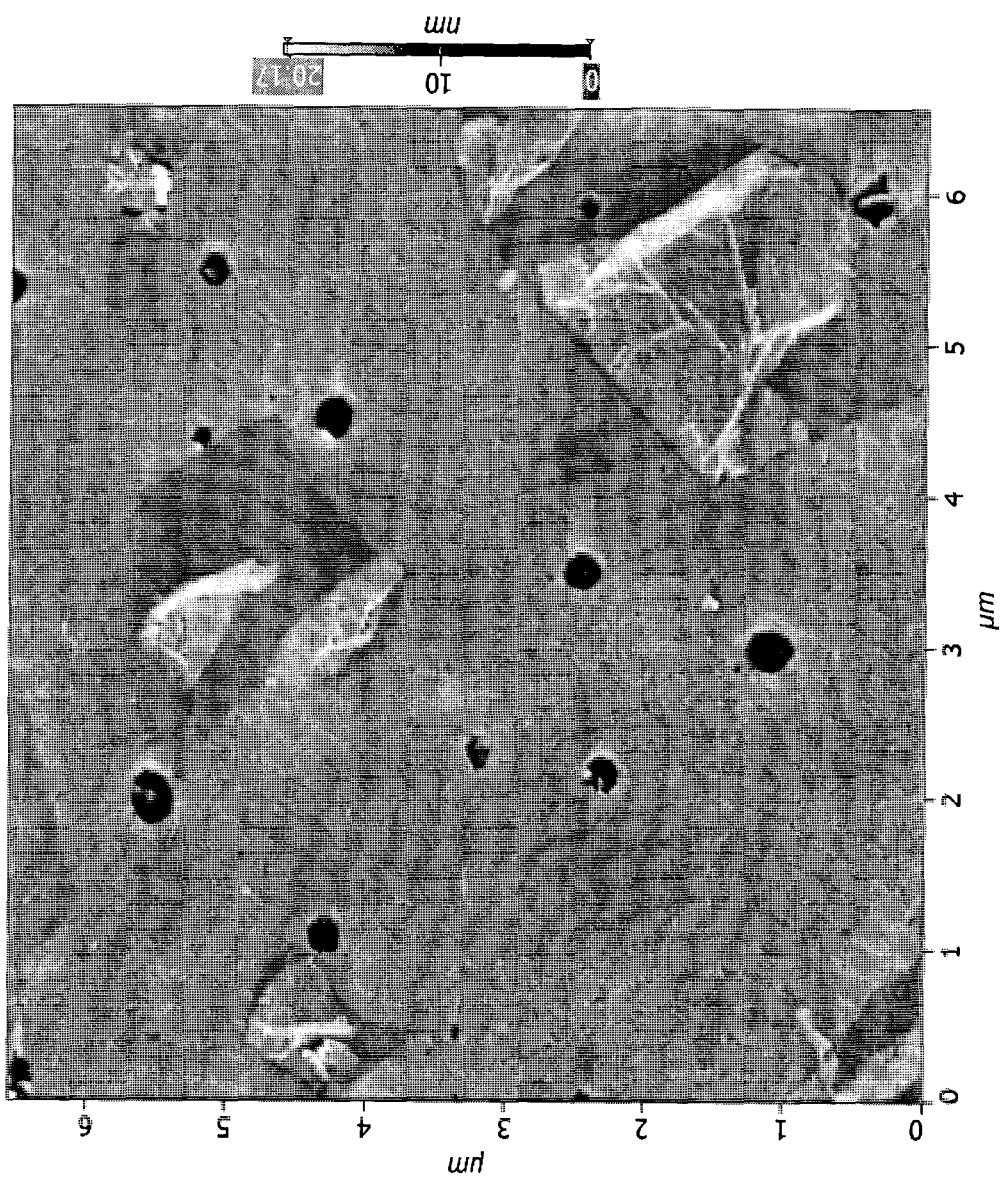
FIG. 10 shows an AFM image of several single-layer graphene sheets embedded into a film of polyether imide (PEI)
Figure 11:
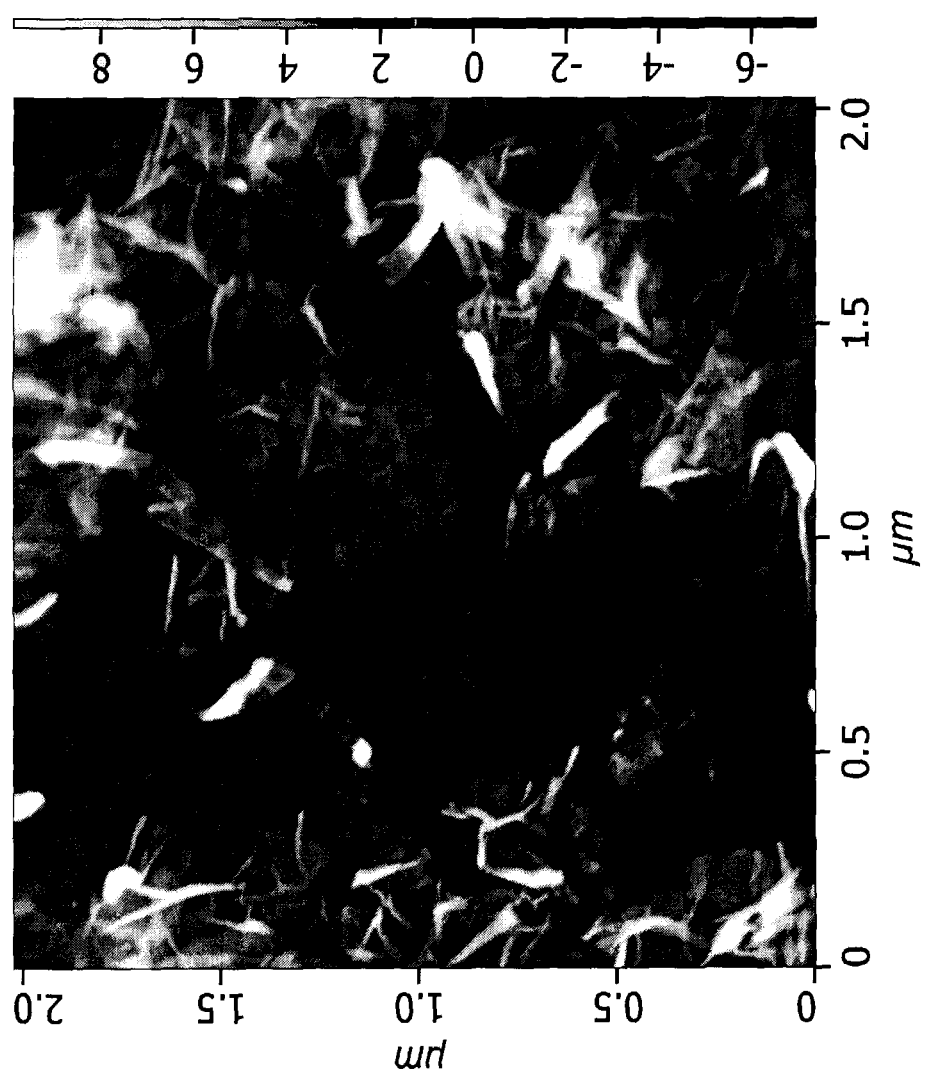
FIG. 11 shows an AFM image of graphene nanoparticles that were produced by heat-induced reduction of graphite oxide on a mica surface.

FIG. 10 shows an AFM image of several single-layer graphene sheets embedded into a film of PEI. The sample was prepared by first spin-coating aqueously dispersed graphene oxide sheets on top of a mica surface. Subsequently, a solution of PEI in DMF was added on top of the surface. This PEI-graphene oxide film was then heated to 250° C. and held for 30 minutes. The AFM image showed significant wrinkling of the sheets, which indicated that the graphene oxide sheets embedded in PEI were reduced during the heating step. Prior to reduction, graphene oxide sheets were very flat (see FIG. 1); during reduction, they usually obtained a significantly wrinkled morphology. For example, FIG. 11 shows an AFM image of graphene nanoparticles that were produced by heat-induced reduction of graphene oxide on a mica surface, and these graphene nanoparticles have a wrinkled appearance.

Example 5

In this example, the weight fractions of the significant elements in the graphene oxide and graphene in one embodiment were measured via elemental analysis (Galbraith, Knoxville, Tenn.). Table 1 shows values of the corresponding molar carbon to oxygen ratio over a range of representative polymer processing temperatures for a relatively short time in the presence of air and when the graphite oxide was in a non reactive fluid, dimethyl formamide, along with the atomic carbon to oxygen ratio of two different batches of graphite oxide prepared by the Hummers method. "#" in "FGS-#" denotes the atomic carbon to oxygen ratio in the FGS. The results show that in air or a non reactive medium and at typical polymer processing times and temperatures, the graphene oxide was reduced. The lower portion of Table 1 shows the results of the samples and their respective reduction conditions with respect to temperature and time. The results show that the value of the atomic carbon oxygen ratio was affected by the processing temperature and time within the range of polymer fabrication procedures generally known in the art. Specifically, the ratio was substantially increased as a result of the presently described process from about 2 to one that approaches pure graphene.

TABLE 1

Results from an FGS elemental analysis

| Sample | % Carbon | % Oxygen | % Hydrogen | % Other | FGS# |
|---|---|---|---|---|---|
| Hummer Prepared FGS 2 | | | | | |
| 1 | 58.26* | 41.74 | 0* | 0* | 1.86 |
| 2 | 53.16 | 36.74 | 2.12 | 7.98 | 1.93 |
| Reduced FGS | | | | | |
| 400 C., 10 min | 78.59* | 21.41 | 0* | 0* | 4.89 |
| 300 C., 10 min | 83.8* | 16.2 | 0* | 0* | 6.89 |
| 250 C., 10 min | 79.95* | 20.05 | 0* | 0* | 5.31 |
| 200 C., 10 min | 81.22* | 18.78 | 0* | 0* | 5.76 |
| 250 C., 4 hr, DMF, pressure | 73.06 | 11.84 | 7.15 | 7.95 | 8.22 |

*Values inferred from actual test measurements for at least one other element

All publications, patents, and patent applications cited herein are hereby expressly incorporated by reference in their entirety and for all purposes to the same extent as if each was so individually denoted.

While specific embodiments of the subject invention have been discussed, the above Specification is illustrative and not restrictive. Many variations of the invention will become apparent to those skilled in the art upon review of this specification. The full scope of the invention should be determined by reference to the claims, along with their full scope of equivalents, and the specification, along with such variations.

The articles "a" and "an" are used herein to refer to one or to more than one (i.e. to at least one) of the grammatical object of the article. By way of example, "a polymer resin" means one polymer resin or more than one polymer resin. Any ranges cited herein are inclusive. The terms "substantially" and "about" used throughout this Specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

REFERENCES

[1] Schniepp et al. "Functionalized Single Graphene Sheets Derived from Splitting Graphite Oxide." *J. Phys. Chem. B* 110, 8535-8539 (2006).
[2] Ramanathan et al. "Graphitic Nanofillers in PMMA Nanocomposites—An Investigation of Particle Size and Dispersion and Their Influence on Nanocomposite Properties." *J. Polym. Sci. B* 45, 2097-2112 (2007).
[3] Kelly. "The Physics of Graphite." Applied Science, Essex, England: 1981.
[4] Blakslee et al. "Elastic Constants of Compression-Annealed Pyrolytic Graphite." *J. Appl. Phys.* 41, 3373 (1970).
[5] Novoselov et al. "Electric Field Effect in Atomically Thin Carbon Films." *Science* 306, 666 (2004).
[6] Vickery et al. "Fabrication of Graphene-Polymer Nanocomposites with Higher Order Three-Dimensional Architecture." *Adv. Mater.* 21, 2180 (2009).
[7] Stankovich et al. "Graphene Based Composite Materials." *Nature* 442, 282-286 (2006).
[8] Xu et al. "Thermal Analysis of Polyvinyl Alcohol/Graphite Oxide Intercalated Composites." *Polymer Degradation and Stability* 73, 29-31 (2001).
[9] Du et al. "New Method to Prepare Graphite Nanocomposites." *Chem. Mat* 20, 2066-2068 (2008).
[10] Hummers et al. "Preparation of Graphite Oxide." *J. Am. Chem. Soc.* 80, 1339 (1958).
[11] McAllister et al. "Single Sheet Functionalized Graphene by Oxidation and Thermal Expansion of Graphite." *Chem. Mater.* 19, 4396 (2007).

What is claimed:

1. A method for producing a graphene-containing product that includes a graphene-containing component, comprising:
   (i) mixing graphene oxide with a medium to form a mixture, wherein the medium comprises a polymer or a precursor thereof; and
   (ii) heating the mixture to a temperature equal to or above 140° C. and equal to or below 250° C.,
   wherein said graphene-containing product comprises a polymer;
   wherein the weight ratio of said polymer to said graphene-containing component in said graphene-containing product is equal to or greater than twenty to one;
   wherein said step of heating is sufficient to transform said graphene oxide into a graphene-containing component and conducted for a sufficient time to transform said graphene oxide into said graphene-containing component; and
   wherein the atomic carbon to oxygen ratio in said graphene-containing component is greater than about 4.

2. The method of claim 1, wherein step (ii) is carried out in open air.

3. The method of claim 1, wherein step (ii) is carried out for less than or equal to about 4 hours.

4. The method of claim 1, wherein step (ii) is selectively applied to the mixture such that at least one localized region having a relative increase in graphene concentration is formed in the mixture.

5. The method of claim 1, wherein compared to the graphene oxide, the graphene-containing component formed after step (ii) has at least one of: enhanced modulus, greater load at failure, increased hardness, improved elongation properties, reduced gas permeability, enhanced thermal processing, and enhanced electrical and electromagnetic field properties.

6. The method of claim 1, wherein compared to the graphene oxide, the graphene-containing component formed after step (ii) has an increased electrical conductivity.

7. The method of claim 1, wherein the graphene-containing component is in the form of at least one nanoparticle.

8. The method of claim 1, further comprising controlling the atomic carbon to oxygen ratio of graphene oxide.

9. The method of claim 1, wherein said graphene-containing product is a foam.

10. The method of claim 1, wherein said graphene-containing product comprises a conductive surface.

* * * * *